United States Patent
Lan et al.

(10) Patent No.: US 9,425,931 B2
(45) Date of Patent: Aug. 23, 2016

(54) PUCCH RESOURCE MANAGEMENT MECHANISM FOR COORDINATED MULTI-POINT OPERATION

(75) Inventors: Yuanrong Lan, Beijing (CN); Jianchi Zhu, Beijing (CN); Haipeng Lei, Beijing (CN); Kodo Shu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 14/379,963

(22) PCT Filed: Mar. 2, 2012

(86) PCT No.: PCT/CN2012/071874
§ 371 (c)(1),
(2), (4) Date: Aug. 20, 2014

(87) PCT Pub. No.: WO2013/127089
PCT Pub. Date: Sep. 6, 2013

(65) Prior Publication Data
US 2015/0365207 A1     Dec. 17, 2015

(51) Int. Cl.
| | | |
|---|---|---|
| H04W 72/04 | (2009.01) | |
| H04L 5/00 | (2006.01) | |
| H04W 88/08 | (2009.01) | |

(52) U.S. Cl.
CPC ............ *H04L 5/0035* (2013.01); *H04L 5/0048* (2013.01); *H04L 5/0053* (2013.01); *H04L 5/0094* (2013.01); *H04W 72/042* (2013.01); *H04W 72/0413* (2013.01);
(Continued)

(58) Field of Classification Search
CPC ................................................... H04L 5/0035
See application file for complete search history.

(56) References Cited

U.S. PATENT DOCUMENTS

| | | | | |
|---|---|---|---|---|
| 2008/0080422 A1* | 4/2008 | Frederiksen | .......... | H04L 1/1607 370/329 |
| 2011/0038329 A1 | 2/2011 | Luo et al. | | |
| 2013/0039284 A1* | 2/2013 | Marinier | ................. | H04L 5/001 370/329 |

FOREIGN PATENT DOCUMENTS

| | | |
|---|---|---|
| CN | 101442818 A | 5/2009 |
| CN | 102202311 A | 9/2011 |
| CN | 102210181 A | 10/2011 |

OTHER PUBLICATIONS

International Search Report and Written Opinion received for corresponding Patent Cooperation Treaty Application No. PCT/CN2012/071874, dated Dec. 13, 2012, 13 pages.
(Continued)

*Primary Examiner* — John Blanton
(74) *Attorney, Agent, or Firm* — Nokia Technologies Oy

(57) ABSTRACT

A method for uplink control signaling in CoMP operation is described. The method includes allocating a first set of CCEs for an associated transmission from an AP to an associated UE. The method also includes transmitting, to a RRH, a message including an indication of the first set of CCEs. The message including the indication of a first set of CCEs is received at the RRH. The method also includes allocating, by the RRH, a second set of CCEs for an associated transmission from the RIM to an associated UE. A UE receives the transmission of downlink control information beginning at a first CCE. The method includes receiving a PUCCH resource offset parameter, the PUCCH resource offset parameter indicating the reception point for the UE. The UE determines an uplink control channel resource based on the first CCE and the PUCCH resource offset parameter.

19 Claims, 7 Drawing Sheets

(52) U.S. Cl.
CPC .......... *H04W 72/0426* (2013.01); *H04L 5/001* (2013.01); *H04W 88/085* (2013.01)

(56) References Cited

OTHER PUBLICATIONS

"PUCCH Enhancement for UL CoMP", R1-120326, 3GPPTSG RAN1 #68, Dresden, Germany, Feb. 10, 2012, Section 2.1.

"Uplink Control Signaling for CoMP", 3GPP TSG-RAN WG1 #67, R1-114118, Agenda item: 7.5.4.3, Qualcomm Incorporated, Nov. 14-18, 2011, pp. 1-3.

"Uplink Control Access and Transmission", 3GPP TSG RAN WG1 meeting #67, R1-113649, Agenda Item: 7.5.4.3, Huawei, Nov. 14-18, 2011, 4 pages.

"PUCCH Enhancements for CoMP", 3GPP TSG RAN WG1 Meeting #67, R1-114326, Agenda item: 7.5.4.3, Nokia Siemens Networks, Nov. 14-18, 2011, 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 8)", 3GPP TS 36.300, V8.12.0, Mar. 2010, pp. 1-149.

"3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (Release 9)", 3GPP TS 36.300, V9.9.0, Dec. 2011, pp. 1-174.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 10)", 3GPP TS 36.300, V10.6.0, Dec. 2011, pp. 1-194.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 11)", 3GPP TS 36.300, V11.0.0, Dec. 2011, pp. 1-194.

"3rd Generation Partnership Project; Technical Specification Group Radio Access Network; Requirements for further advancements for Evolved Universal Terrestrial Radio Access (E-UTRA) (LTE-Advanced) (Release 8)", 3GPP TR 36.913, V8.0.1, Mar. 2009, pp. 1-15.

"3rd Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913, V9.0.0, Dec. 2009, pp. 1-15.

"3rd Generation Partnership Project; Technical Specification Group Radio Access Network; Requirements for further advancements for Evolved Universal Terrestrial Radio Access (E-UTRA) (LTE-Advanced) (Release 10)", 3GPP TR 36.913, V10.0.0, Mar. 2011, pp. 1-15.

"3rd Generation Partnership Project;Technical Specification Group Radio Access Network;Evolved Universal Terrestrial Radio Access (E-UTRA);Physical layer procedures (Release 10)", 3GPP TS 36.213, V10.4.0, Dec. 2011, pp. 1-125.

Extended European Search Report received for corresponding European Patent Application No. 12869707.5, dated Sep. 15, 2015, 8 pages.

"Consideration for PUCCH Enhancement for CoMP", 3GPP TSG RAN WG1 Meeting #68, R1-120311, Agenda item: 7.5.6.3, ZTE, Feb. 6-10, 2012, pp. 1-5.

"Uplink Reference Signals for CoMP", 3GPP TSG-RAN WG1 #66bis, R1-113390, Agenda item: 7.5.4.2, Qualcomm Incorporated, Oct. 10-14, 2011, pp. 1-6.

"PUCCH Enhancements for CoMP", 3GPP TSG RAN WG1 Meeting #68, R1-120730, Agenda item: 7.5.4.3, Nokia Siemens Networks, Feb. 6-10, 2012, 4 pages.

\* cited by examiner

PUCCH RESOURCE MANAGEMENT MECHANISM FOR COORDINATED MULTI-POINT OPERATION

RELATED APPLICATION

This application was originally filed as Patent Cooperation Treaty Application No. PCT/CN2012/071874 filed Mar. 2, 2012.

TECHNICAL FIELD

The exemplary and non-limiting embodiments of this invention relate generally to wireless communication systems, methods, devices and computer programs and, more specifically, relate to uplink control signaling for CoMP operation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACK acknowledge
BW bandwidth
CC component carrier
CCE control channel element
CDM code division multiplexing
CoMP coordinated multi-point
DCI downlink control information
DL downlink (eNB towards UE)
eNB E-UTRAN Node B (evolved Node B)
EPC evolved packet core
E-UTRAN evolved UTRAN (LTE)
ePDCCH enhance PDCCH
HARQ hybrid automatic repeat request
IMT-A international mobile telephony-advanced
ITU international telecommunication union
ITU-R ITU radiocommunication sector
LTE long term evolution of UTRAN (E-UTRAN)
MAC medium access control (layer 2, L2)
MM/MME mobility management/mobility management entity
NACK negative-acknowledge
Node B base station
O&M operations and maintenance
OFDMA orthogonal frequency division multiple access
PDCCH physical downlink control channel
PDCP packet data convergence protocol
PDSCH physical downlink shared channel
PHY physical (layer 1, L1)
PUCCH physical uplink control channel
PUSCH physical uplink shared channel
RLC radio link control
RRC radio resource control
RRH remote radio head
RRM radio resource management
SC-FDMA single carrier, frequency division multiple access
S-GW serving gateway
UE user equipment, such as a mobile station or mobile terminal
UL uplink (UE towards eNB)
UTRAN universal terrestrial radio access network The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.12.0 (2010-04), "3rd Generation Partnership Project; Technical Specification Group Radio Access Network; Evolved Universal Terrestrial Radio Access (E UTRA) and Evolved Universal Terrestrial Access Network (E UTRAN); Overall description; Stage 2 (Release 8)". This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.9.0 (2011-12), and Release 10 versions of at least some of these specifications have been published including 3GPP TS 36.300, V10.6.0 (2011-12). Even more recently, Release 11 versions of at least some of these specifications have been published including 3GPP TS 36.300, V11.0.0 (2011-12).

FIG. 1 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
  functions for RRM: Radio Bearer Control, Radio Admission Control, Connection Mobility Control, Dynamic allocation of resources to UEs in both UL and DL (scheduling);
  IP header compression and encryption of the user data stream;
  selection of a MME at UE attachment;
  routing of User Plane data towards the Serving Gateway;
  scheduling and transmission of paging messages (originated from the MME);
  scheduling and transmission of broadcast information (originated from the MME or O&M); and
  a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009 03), 3rd Generation Partnership Project; Technical Specification Group Radio Access Network; Requirements for Further Advancements for E UTRA (LTE-Advanced) (Release 8). A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A will most likely be part of LTE Rel-10. LTE-A will be a more optimized radio system fulfilling the ITU-R requirements for IMT-A while maintaining backward compatibility with LTE Rel-8. Reference is further made to a Release 9 version of 3GPP TR 36.913, V9.0.0 (2009-12). Reference is also made to a Release 10 version of 3GPP TR 36.913, V10.0.0 (2011-06).

As is specified in 3GPP TR 36.913, LTE-A should operate in spectrum allocations of different sizes, including wider spectrum allocations than those of Rel-8 LTE (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 2 shows an example of the carrier aggregation, where M Rel-8 component carriers are combined together to form M×Rel-8 BW (e.g., 5×20 MHz=100 MHz given M=5). Rel-8 terminals receive/transmit on one component carrier, whereas LTE-A terminals may receive/transmit on multiple component carriers simultaneously to achieve higher (wider) bandwidths.

With further regard to carrier aggregation, what is implied is that one eNB can effectively contain more than one cell on more than one CC (frequency carrier), and the eNB can utilize one (as in E-UTRAN Rel-8) or more cells (in an aggregated manner) when assigning resources and scheduling the UE.

Coordinated multi-point (CoMP) offers higher data transmission rate and better quality. These benefits may be seen especially for cell-edge users. In one CoMP scenario (scenario #3), inter-cell coordination operations occur where the remote radio heads (RRHs) and the eNB have different cell IDs.

In order to improve reception performance and reduce UE's uplink transmit power, a UE's reception points could be selected based on which reception has the better receive power at the reception point. In the downlink, the power received at a UE from a transmission point may also depend on the transmit power of that transmission point in addition to the path loss between the UE and the transmission point. For heterogeneous networks when transmitters of different power classes are used, the best transmission point may not correspond to the best reception point. The transmission point and the reception point may use different CC. The signal response in the CC may also influence which transmission point and/or reception point is preferred.

FIG. 3 illustrates PUCCH transmissions in a CoMP scenario. This scenario is often referred to as "Scenario #3". As shown, the macro-cell 310 is served by eNB1. The macro cell 310 includes micro cells 320 and 330. Micro-cell 320 is served by RRH1 and micro-cell 330 is served by remote radio head (RRH) RRH2. As shown, RRH1 and RRH2 can communicate with eNB1 over the backhaul (e.g., a fiber cable).

In CoMP scenario 3, UEs can roughly be divided into three categories: RRH UEs which have RRH as reception and transmission point; CoMP UEs which have an eNB as transmission point (e.g., for PDCCH) and a RRH as reception point (e.g., for PUCCH/PUSCH); and legacy mode UEs which have eNB as both the reception and transmission point. The various UEs in FIG. 3 are shown operating in the macrocell. As shown, eNB1 is the optimal transmission point for UE1 while RRH1 is the optimal reception point. Therefore, UE1 is operated as a CoMP UE in order to use the eNB1 as a transmission point and the RRH1 as a reception point. UE2 and UE3 are both RRH UEs. UE2 uses RRH1 as both a transmission point and as a reception point. Likewise, UE3 uses RRH2. Lastly, UE5 operates in a legacy mode using eNB1 as both a transmission point and as a reception point.

The general PUCCH resource determination for HARQ-ACK feedback in Rel 8/9/10, as stated in 3GPP TR 36.213 v.10.4.0, specifies: "for a PDSCH transmission indicated by the detection of a corresponding PDCCH in subframe n-4, or for a PDCCH indicating downlink SPS release (defined in section 9.2) in subframe n-4, the UE shall use $n_{PUCCH}^{(1,\tilde{p}=p_0)}=n_{CCE}+N_{PUCCH}^{(1)}$ for antenna port $p_0$, where $n_{CCE}$ is the number of the first CCE (i.e. lowest CCE index used to construct the PDCCH) used for transmission of the corresponding DCI assignment and $N_{PUCCH}^{(1)}$ is configured by higher layers" (10.1.2.1).

Accordingly, the PUCCH index of a UE is determined by a dynamic PUCCH starting point $N_{PUCCH}^{(1)}$ and the first CCE index $n_{CCE}$ of the corresponding DCI assignment, where the $N_{PUCCH}^{(1)}$ is configured through high layer signaling (e.g., by a downlink serving basestation). This in turn influences which physical uplink control channel (PUCCH) will be used. As shown in FIG. 3, $N_{PUCCH}^{(1)}$ of the UE1 is configured by higher signaling from the eNB1 and $N_{PUCCH}^{(1)}$ of the UE2 is configured by higher signaling from the eNB2.

With the flexible uplink access (where reception points are selected independently of transmission points), the targeted reception cell may be different from the cell that granted the uplink transmission. Because $n_{CCE}$ is randomly determined by the PDCCH CCE mapping and the $N_{PUCCH}^{(1)}$ or is configured by the UE's DL serving cell, it is possible that the PUCCH resource $n_{PUCCH}^{(1,\tilde{p}=p_0)}=n_{CCE}+N_{PUCCH}^{(1)}$ used by a CoMP UE may collide with a PUCCH resource of a RRH UE which has the same RRH as an uplink reception point.

Conventional techniques have attempted to solve the PUCCH collision issue. A first technique reserves an additional dynamic PUCCH region for eNB on each RRH and introduces a UE-specific PUCCH dynamic resource offset parameter. With the help of a PUCCH resource offset parameter, the dynamic PUCCH region on RRH1 for CoMP UE is moved to avoid collision with the one on eNB1. Another technique reserves a feedback resource on the uplink of the targeted reception cell if the targeted transmission cell and targeted reception cell of a UE are different. The parameter(s) related with the feedback resource are indicated to the UE. A third approach shares orthogonal/non-orthogonal PUCCH resources to improve baseline CoMP operation. This operates by having multiple PUCCH resource pools for CoMP which can be implemented by decoupling the cell ID used for PDCCH and PUCCH.

These three approaches focus on providing different PUCCH resources $n_{PUCCH}^{(1,\tilde{p}=p_0)}=n_{CCE}+N_{PUCCH}^{(1)}$ for RRH UE and CoMP UE by providing different $N_{PUCCH}^{(1)}$. However, these techniques may increase the overhead in the PUCCH, for example, by reserving various PUCCH areas which might otherwise be used.

What is needed is a technique to prevent PUCCH collision between RRH UEs and CoMP UEs when both share the same RRH as uplink reception point.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for uplink control signaling in CoMP operation. The method includes receiving, at a RRH, a message including an indication of a first set of CCEs for an associated transmission from an AP to an associated UE. The method also includes allocating a second set of CCEs for an associated transmission from the RRH to an associated UE.

In a further aspect thereof an exemplary embodiment of this invention provides a method for uplink control signaling in CoMP operation. The method includes allocating a first set of CCEs for an associated transmission from an AP to an associated UE. The method also includes transmitting, to a RRH, a message including an indication of the first set of CCEs.

Another exemplary embodiment in accordance with this invention is a method for uplink control signaling in CoMP operation. The method includes receiving, at a UE, a transmission of downlink control information beginning at a first CCE. The method includes receiving a PUCCH resource offset parameter. The method also includes determining an uplink control channel resource based on the first CCE and the PUCCH resource offset parameter.

In a further aspect thereof an exemplary embodiment of this invention provides an apparatus for uplink control signaling in CoMP operation. The apparatus includes at least one processor and at least one memory including computer program code. The at least one memory and the computer program code are configured to, with the at least one processor, cause the apparatus to perform actions. The actions include receiving, at a RRH, a message including an indication of a first set of CCEs for an associated transmission from an AP to an associated UE. The actions also include allocating a second set of CCEs for an associated transmission from the RRH to an associated UE.

Another exemplary embodiment in accordance with this invention is an apparatus for uplink control signaling in CoMP operation. The apparatus includes at least one processor and at least one memory including computer program code. The at least one memory and the computer program code are configured to, with the at least one processor, cause the apparatus to perform actions. The actions include allocating a first set of CCEs for an associated transmission from an AP to an associated UE. The actions also include transmitting, to a RRH, a message including an indication of the first set of CCEs.

In a further aspect thereof an exemplary embodiment of this invention provides an apparatus for uplink control signaling in CoMP operation. The apparatus includes at least one processor and at least one memory including computer program code. The at least one memory and the computer program code are configured to, with the at least one processor, cause the apparatus to perform actions. The actions include receiving, at a UE, a transmission of downlink control information beginning at a first CCE. The actions include receiving a PUCCH resource offset parameter using higher layer signaling. The actions also include determining an uplink control channel resource based on the first CCE and the PUCCH resource offset parameter.

Another exemplary embodiment in accordance with this invention is a computer readable medium for uplink control signaling in CoMP operation. The computer readable medium is tangibly encoded with a computer program executable by a processor to perform actions. The actions include receiving, at a RRH, a message including an indication of a first set of CCEs for an associated transmission from an AP to an associated UE. The actions also include allocating a second set of CCEs for an associated transmission from the RRH to an associated UE.

In a further aspect thereof an exemplary embodiment of this invention provides a computer readable medium for uplink control signaling in CoMP operation. The computer readable medium is tangibly encoded with a computer program executable by a processor to perform actions. The actions include allocating a first set of CCEs for an associated transmission from an AP to an associated UE. The actions also include transmitting, to a RRH, a message including an indication of the first set of CCEs.

Another exemplary embodiment in accordance with this invention is a computer readable medium for uplink control signaling in CoMP operation. The computer readable medium is tangibly encoded with a computer program executable by a processor to perform actions. The actions include receiving, at a UE, a transmission of downlink control information beginning at a first CCE. The actions include receiving a PUCCH resource offset parameter using higher layer signaling. The actions also include determining an uplink control channel resource based on the first CCE and the PUCCH resource offset parameter.

In a further aspect thereof an exemplary embodiment of this invention provides an apparatus for uplink control signaling in CoMP operation. The apparatus includes means for receiving, at a RRH, a message including an indication of a first set of CCEs for an associated transmission from an AP to an associated UE. The apparatus also includes means for allocating a second set of CCEs for an associated transmission from the RRH to an associated UE.

Another exemplary embodiment in accordance with this invention is an apparatus for uplink control signaling in CoMP operation. The apparatus includes means for allocating a first set of CCEs for an associated transmission from an AP to an associated UE. The apparatus also includes means for transmitting, to a RRH, a message including an indication of the first set of CCEs.

In a further aspect thereof an exemplary embodiment of this invention provides an apparatus for uplink control signaling in CoMP operation. The apparatus includes means for receiving, at a UE, a transmission of downlink control information beginning at a first CCE. The apparatus includes means for receiving a PUCCH resource offset parameter using higher layer signaling. The apparatus also includes means for determining an uplink control channel resource based on the first CCE and the PUCCH resource offset parameter.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention provide techniques for uplink control signaling for CoMP operation. The eNB and RRHs coordinate their transmissions in order to ensure that UEs having the same $N_{PUCCH}^{(1)}$ are each given a distinct $n_{CCE}$. The RRHs are informed of CCEs reserved by the eNB (e.g., for CoMP UEs) and may then select CCEs for RRH UEs.

Figure 4:
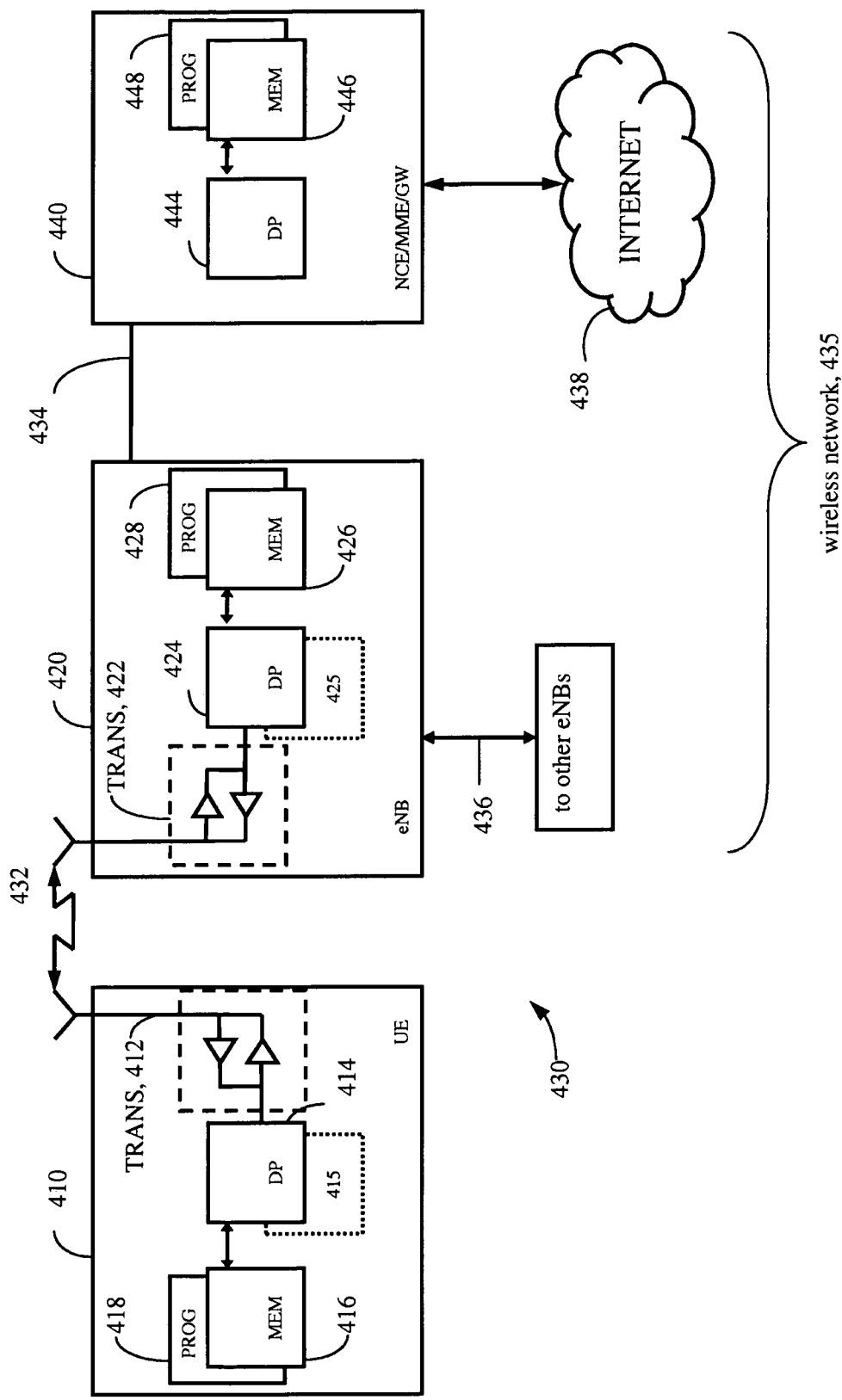
FIG. 4 shows a simplified block diagram of exemplary electronic devices that are suitable for use in practicing various exemplary embodiments of this invention.

Before describing in further detail various exemplary embodiments of this invention, reference is made to FIG. 4 for illustrating a simplified block diagram of various electronic devices and apparatus that are suitable for use in practicing exemplary embodiments of this invention.

Figure 1:
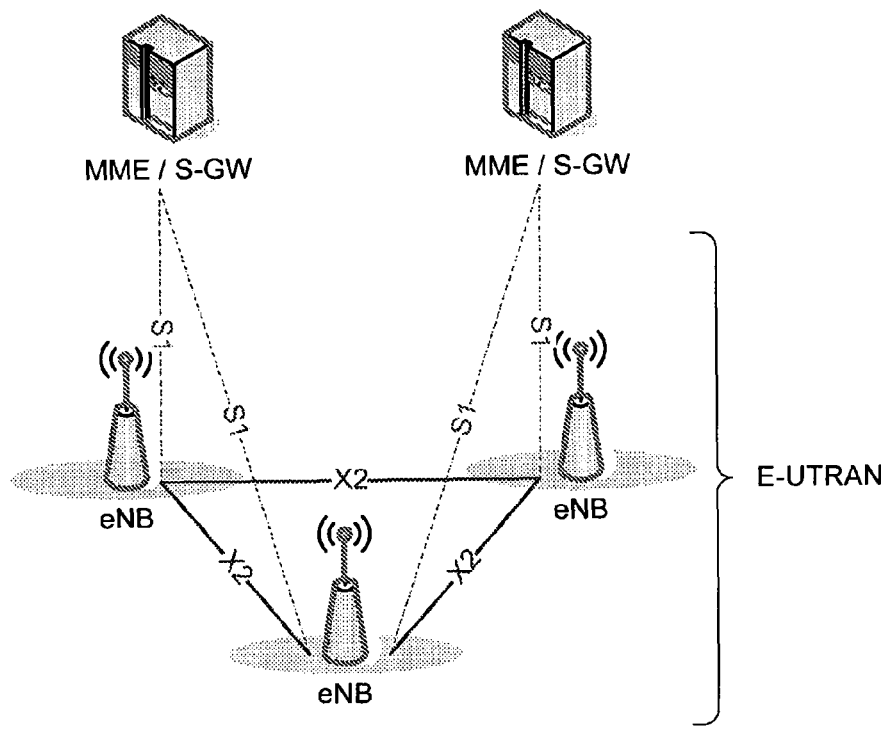
FIG. 1 reproduces FIG. 4-1 of 3GPP TS 36.300, and shows the overall architecture of the E UTRAN system.
Figure 2:
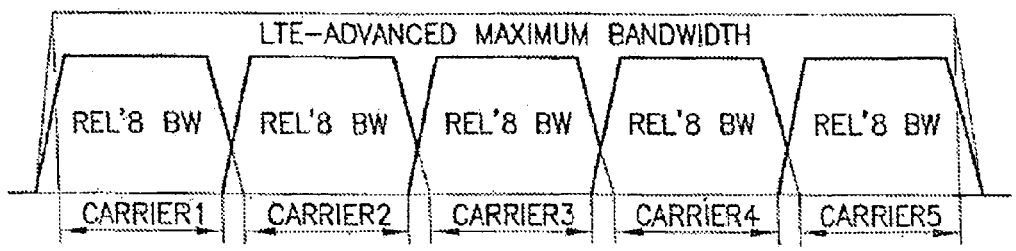
FIG. 2 shows an example of carrier aggregation as proposed for the LTE-A system.
Figure 3:
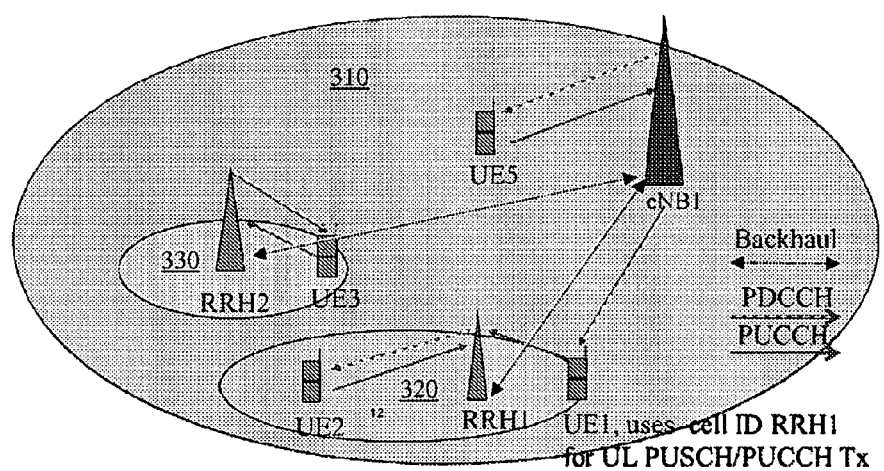
FIG. 3 illustrates PUCCH transmissions in a CoMP scenario.

In the wireless system 430 of FIG. 4, a wireless network 435 is adapted for communication over a wireless link 432 with an apparatus, such as a mobile communication device which may be referred to as a UE 410, via a network access node, such as a Node B (base station), and more specifically an eNB 420. The network 435 may include a network control element (NCE) 440 that may include the MME/SGW functionality shown in FIG. 1, and which provides connectivity with a network, such as a telephone network and/or a data communications network (e.g., the internet 438).

The UE 410 includes a controller, such as a computer or a data processor (DP) 414, a computer-readable memory medium embodied as a memory (MEM) 416 that stores a program of computer instructions (PROG) 418, and a suitable wireless interface, such as radio frequency (RF) transceiver 412, for bidirectional wireless communications with the eNB 420 via one or more antennas.

The eNB 420 also includes a controller, such as a computer or a data processor (DP) 424, a computer-readable memory medium embodied as a memory (MEM) 426 that stores a program of computer instructions (PROG) 428, and a suitable wireless interface, such as RF transceiver 422, for communication with the UE 410 via one or more antennas. The eNB 420 is coupled via a data/control path 434 to the NCE 440. The path 434 may be implemented as the S1 interface shown in FIG. 1. The eNB 420 may also be coupled to another eNB via data/control path 436, which may be implemented as the X2 interface shown in FIG. 1.

The NCE 440 includes a controller, such as a computer or a data processor (DP) 444, a computer-readable memory medium embodied as a memory (MEM) 446 that stores a program of computer instructions (PROG) 448.

At least one of the PROGs 418, 428 and 448 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 414 of the UE 410; by the DP 424 of the eNB 420; and/or by the DP 444 of the NCE 440, or by hardware, or by a combination of software and hardware (and firmware).

The UE 410 and the eNB 420 may also include dedicated processors, for example CoMP processor 415 and CoMP processor 425.

In general, the various embodiments of the UE 410 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 416, 426 and 446 may be of any type suitable to the local technical environment and may be implemented using any suitable data storage technology, such as semiconductor based memory devices, flash memory, magnetic memory devices and systems, optical memory devices and systems, fixed memory and removable memory.

The DPs 414, 424 and 444 may be of any type suitable to the local technical environment, and may include one or more of general purpose computers, special purpose computers, microprocessors, digital signal processors (DSPs) and processors based on a multicore processor architecture, as non-limiting examples. Processors 415 and 425, if embodied as separate entities in a UE 410 or eNB 420, may operate in a slave relationship to the main processor 414, 424, which may then be in a master relationship to them. Note that the various chips (e.g., 424, 425, etc.) that were described above may be combined into a fewer number than described and, in a most compact case, may all be embodied physically within a single chip.

The wireless interfaces (e.g., RF transceivers 412 and 422) may be of any type suitable to the local technical environment and may be implemented using any suitable communication technology such as individual transmitters, receivers, transceivers or a combination of such components. Certain embodiments of the UE 410 may also include one or more secondary radios such as a wireless local area network radio WLAN and a Bluetooth® radio, which may incorporate an antenna on-chip or be coupled to an off-chip antenna.

In order to provide different PUCCH resource $n_{PUCCH}^{(1,\tilde{p}=p_0)}=n_{CCE}+N_{PUCCH}^{(1)}$ for RRH UEs and CoMP UEs when the UEs have the same RRH as an uplink reception point, the same $N_{PUCCH}^{(1)}$ is provided to both UEs and different $n_{CCE}$ are guaranteed for each UE. Different $n_{CCE}$ are ensured by coordinated PDCCH CCE mapping between the eNB and the RRHs.

In a non-limiting exemplary embodiment in accordance with this invention, the eNB performs PDCCH CCE mapping. The eNB may determine a separate mapping for each RRH. Alternatively, the eNB may determine the mapping for a limited set of RRH (e.g., those which act as reception points for CoMP UEs). The mapping indicates the first CCE for a PDCCH transmission. The eNB may perform the CCE mapping using a variety of techniques, for example, the eNB may select the CCE randomly.

The eNB then shares the PDCCH CCE mapping information of a scheduled UE with a RRH which acts as the UE's uplink reception point. For example, the eNB informs the RRH that certain CCEs are used as first CCE by CoMP UEs which have the eNB as a transmission point and the RRH as a reception point.

The RRH may then use the mapping in order to determine a first CCE for PDCCH transmissions from the RRH to RRH UEs. The RRH may allocate a different first CCE for PDCCH transmission for the RRH UEs compared to the first CCE for PDCCH transmission for CoMP UEs. The RRH may reuse the first CCE taken by CoMP UE as non-first CCE for the RRH transmission. The RRH may also send control information of a PDSCH on ePDCCH if the PDCCH capacity is limited The eNB sends an UE-specific PUCCH dynamic resource offset parameter $N_{PUCCH}^{(1)}$ in the downlink (DL) through high layer signaling, e.g., eNB sends the $N_{PUCCH}^{(1)}$ of itself to legacy UEs which have the eNB as both a transmission and a reception point, and sends the $N_{PUCCH}^{(1)}$ of a RRH to UEs which have the RRH as a reception point and have the eNB as the transmission point.

A pair of dynamic PUCCH regions is used on a RRH for the HARQ-ACK transmissions of a RRH UE and a CoMP UE which have the same RRH as an UL reception point.

The RRHs may be connected to the eNB, for example, with a fiber backhaul. The transmission delay through the backhaul is small enough to enable the RRHs and the eNB to share some real-time information including DL scheduling decision and the reception point of CoMP UEs. The eNB and the RRHs are aware of the reception and transmission points of all UEs within the coverage of the macro-cell served by eNB.

Figure 5:
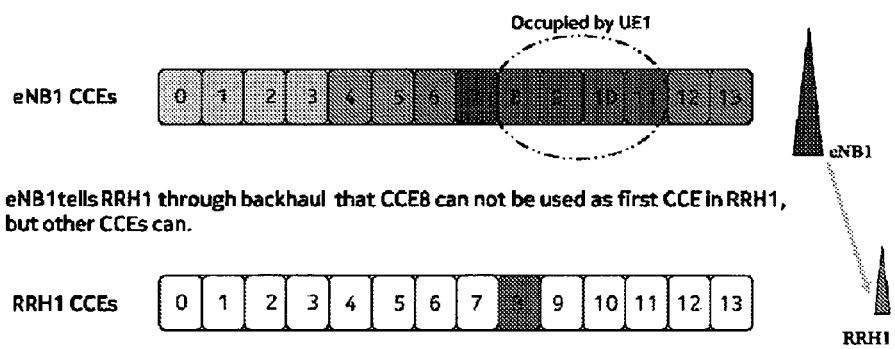
FIG. 5 shows a simplified CCE diagram in accordance with various exemplary embodiments of this invention.

FIG. 5 shows a simplified CCE diagram in accordance with various exemplary embodiments of this invention. The CCE diagram represents thirteen CCE which may be used for PDCCH transmissions. As shown, the PDCCH transmission from the eNB for UE1 (which uses four CCE) is assigned to CCE8 through CCE11. The eNB can then inform RRH1 that CCE8 is allocated as the first CCE for the PDCCH transmission by the eNB. This indication may be provided as a bitmap where each element of the bitmap represents a separate CCE in the PDCCH region.

After receiving the bitmap from the eNB, the RRH knows which CCEs are not available as first CCE. The RRH will not use these CCEs as the first CCE for PDCCH transmissions for RRH UEs; however, the RRH may use these CCEs as non-first CCE. This reuse of the CCE may be prioritized over non-reuse. The RRH can also send the control information of a PDSCH on a ePDCCH if the PDCCH capacity is not sufficient.

Figure 6:
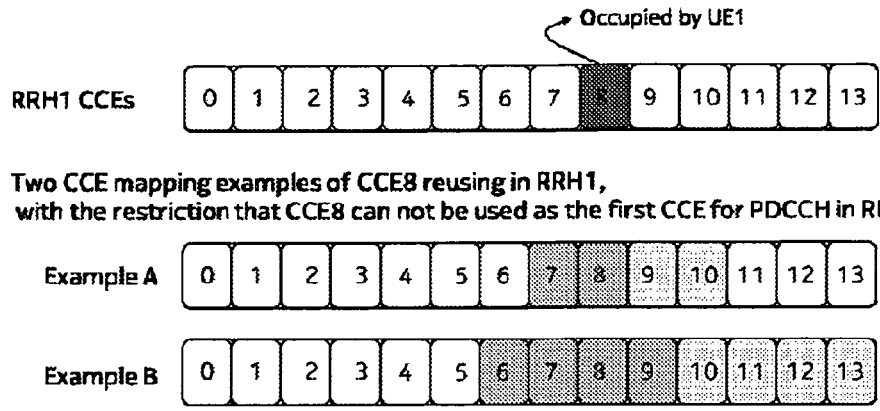
FIG. 6 shows another simplified CCE diagram in accordance with various exemplary embodiments of this invention.

FIG. 6 shows another simplified CCE diagram in accordance with various exemplary embodiments of this invention. As in FIG. 5, CCE8 is allocated as the first CCE for a PDCCH transmission from the eNB.

In Example-A, a two CCE PDCCH has multiple available mapping options. The PDCCH can be mapped to CCE7/CCE8 or CCE9/CCE10. The CCE7/CCE8 option reuses CCE8 as a non-first CCE. Therefore, the RRH may choose to map the PDCCH to CCE7/CCE8 with high priority.

In Example-B, options for a four CCE PDCCH mapping are shown. The RRH may chose to map the PDCCH to CCE6/CCE7/CCE8 CCE9 with high priority, whereas, a mapping of CCE10/CCE11/CCE12/CCE13 which does not reuse CCE8 may be avoided.

The eNB sends a UE-specific PUCCH dynamic resource offset parameter $N_{PUCCH}^{(1)}$. Namely, the eNB sends the $N_{PUCCH}^{(1)}$ of itself to UEs which has eNB as transmission and reception point, and sends $N_{PUCCH}^{(1)}$ of a RRH to a UE which has the RRH as reception point and has eNB as the transmission point. The resource offset parameter of one CoMP UE may differ from the resource offset parameter of another CoMP UE which shares the same eNB if the CoMP UEs have different RRH. Likewise, the resource offset parameter of a CoMP UE and an RRH UE may be the same if both UE have the same RRH as the uplink reception point.

Once the UE receives the PDCCH and the associated $N_{PUCCH}^{(1)}$, the UE can use the PUCCH resource for transmission of a HARQ-ACK, while $n_{PUCCH}^{(1,\tilde{p}=p_0)}=n_{CCE}+N_{PUCCH}^{(1)}$ for FDD, and $n_{PUCCH}^{(1,\tilde{p}=p_0)}$ for TDD can be deducted similarly.

The eNB and RRHs receives HARQ-ACK on PUCCH resources and can retransmit related PDSCH if a NACK is detected on PUCCH resource $n_{PUCCH}^{(1,\tilde{p}=p_0)}$.

Figure 7:
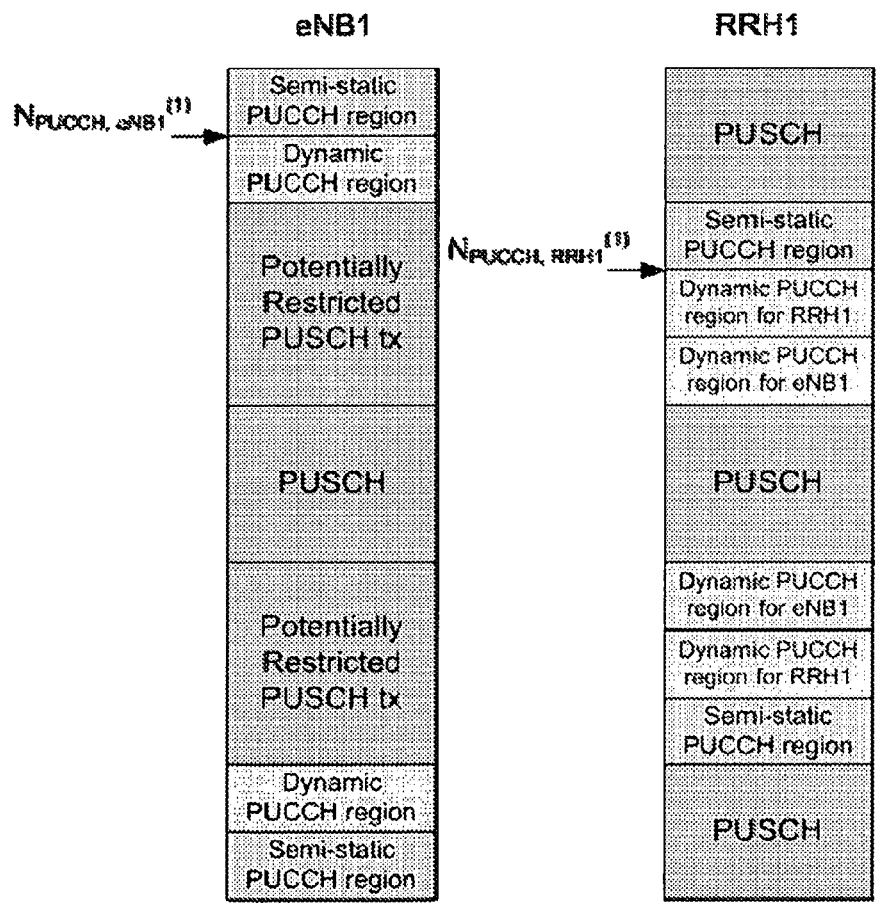
FIG. 7 demonstrates a conventional PUCCH collision solution.
Figure 8:
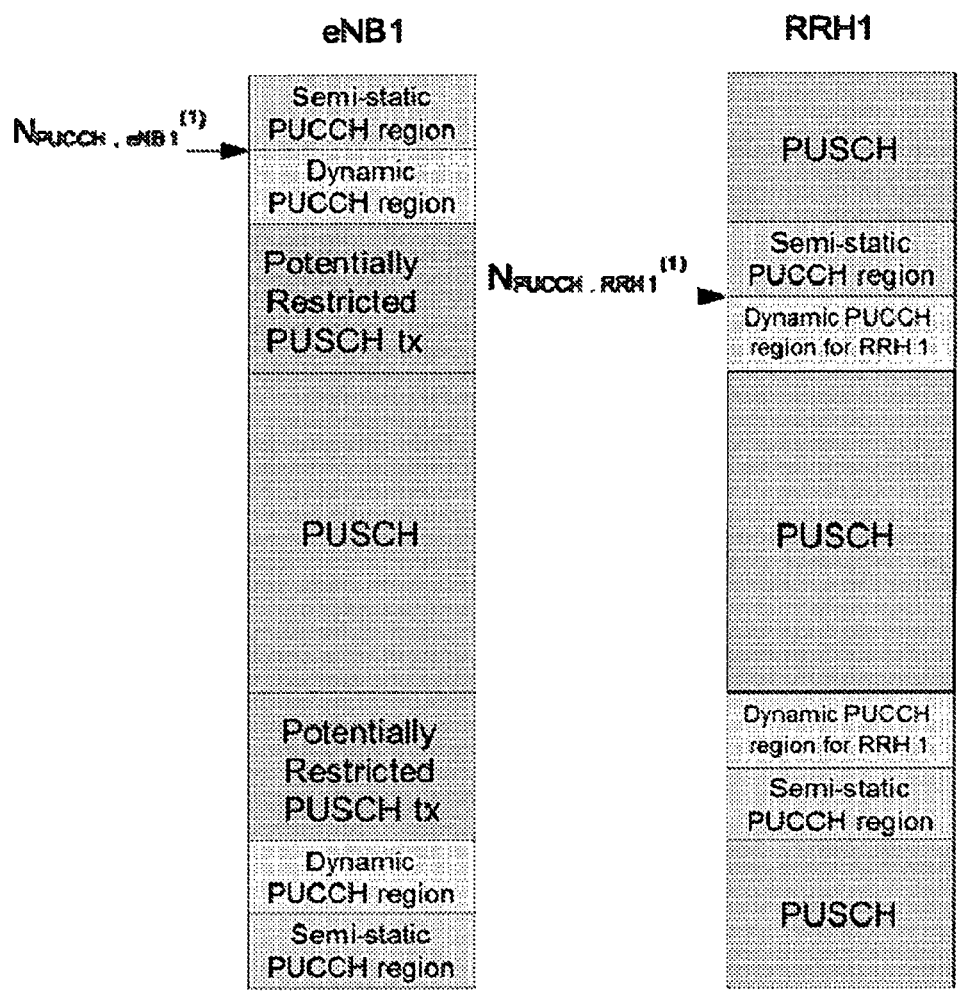
FIG. 8 demonstrates a PUCCH collision solution in accordance with various exemplary embodiments of this invention.

FIG. 7 demonstrates a conventional PUCCH collision solution. This approach attempts to solve the PUCCH collision issue at a cost of introducing a new dynamic PUCCH region for eNB on the RRH. In contrast, FIG. 8 demonstrates a PUCCH collision solution in accordance with various exemplary embodiments of this invention. In the exemplary embodiment, the same goal is achieved with nearly the same the overhead for the PUCCH as that of Rel. 8/9/10. Thus, what would be reserved as the "Dynamic PUCCH region for eNB1" in FIG. 7 is available for both the eNB and RRH in FIG. 8.

Figure 9:
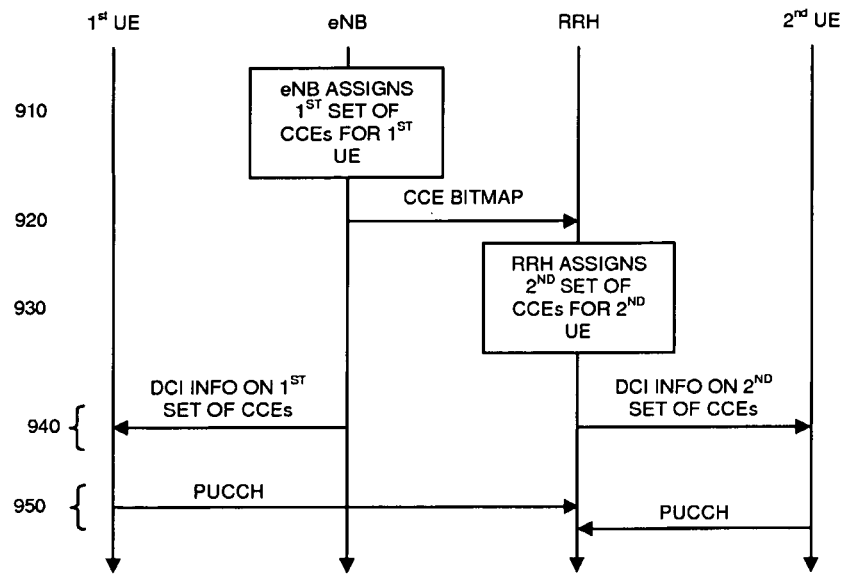
FIG. 9 is a signaling diagram that illustrates the operation of an exemplary method in accordance with various exemplary embodiments of this invention.

FIG. 9 is a signaling diagram that illustrates the operation of an exemplary method in accordance with various exemplary embodiments of this invention.

At time 910, the eNB assigns a first set of CCEs for a first UE (or set of UEs). The first UE may be a CoMP UE using the eNB as a transmission point and the RRH as a reception point. The eNB informs the RRH of the assigned first set of CCEs (for example, with a bitmap), at time 920. At time 930, the RRH, now aware of the assigned CCEs by the eNB, can then assign a second set of CCE for a second UE (or set of UEs). The second UE may be an RRH UE using the RRH as both a transmission point and as a reception point.

Time 940 represents the downlink DCI transmissions from the eNB and the RRH. The downlink DCI transmissions occurs on the sets of CCE scheduled for the transmission, for example, a downlink DCI transmission for the 1st UE is sent by the eNB on the first set of CCE and a downlink DCI transmission for the 2nd UE is sent by the RRH on the second set of CCE. The UEs take note of the lowest/first CCE used in their downlink DCI transmission for use as $n_{CCE}$. These transmissions may occur in any order as scheduled by the eNB and RRH. Due to the coordinated assignment of the CCE, these transmissions should not collide, though they are allowed to overlap.

At time 950, the UEs may provide PUCCH transmissions. Both RRH UEs and CoMP UEs use the RRH as a reception point. The PUCCH index is determined based at least in part on PUCCH dynamic resource offset parameter $N_{PUCCH}^{(1)}$ (received via higher layer signaling) and the $n_{CCB}$ of the corresponding DCI assignment.

In the exemplary embodiments described above, the eNB maps DCI to CCE and sends bitmaps as orders to each RRH so that the RRH may then process the received bitmap for RRH DCI to CCE mapping. However, in another exemplary embodiment in accordance with the invention, the RRH may perform mapping first and provide a bitmap to the eNB. In this embodiment, the eNB may take advantage of the bitmap information received from one or more RRH in order to perform mapping of DCI to CCE.

Based on the foregoing it should be apparent that the exemplary embodiments of this invention provide a method, apparatus and computer program(s) for uplink control signaling in CoMP operation.

Figure 10:
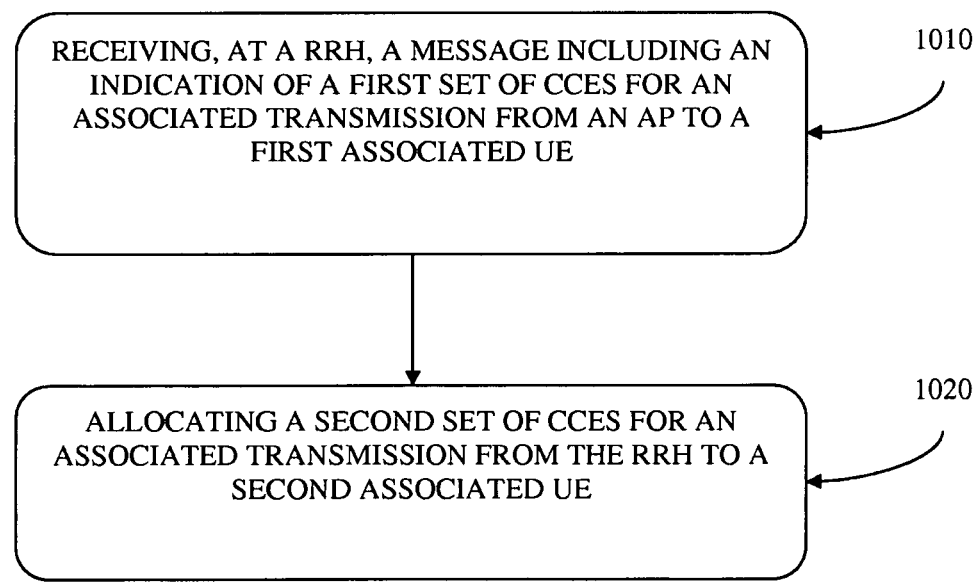
FIG. 10 is a logic flow diagram that illustrates the operation of an exemplary method, and a result of execution of computer program instructions embodied on a computer readable memory, in accordance with various exemplary embodiments of this invention.

FIG. 10 is a logic flow diagram that illustrates the operation of a method, and a result of execution of computer program instructions, in accordance with the exemplary embodiments of this invention. In accordance with these exemplary embodiments a method performs, at Block 1010, a step of receiving, at a RRH, a message including an indication of a first set of CCEs for an associated transmission from an AP to a first associated UE (e.g., a CoMP UE). The method also performs, at Block 1020, a step of allocating a second set of CCEs for an associated transmission from the RRH to a second associated UE (e.g., a RRH UE).

Figure 11:
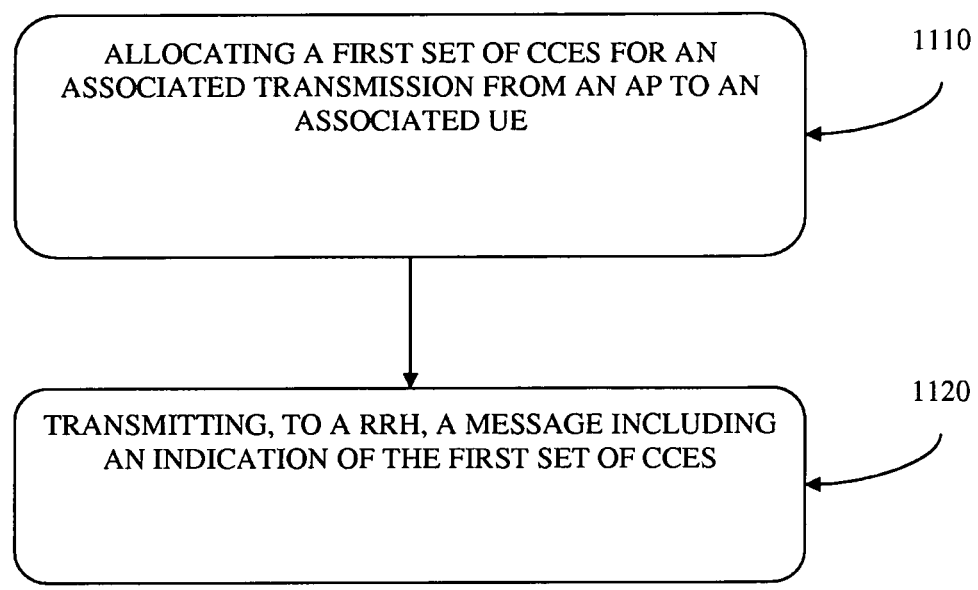
FIG. 11 is another logic flow diagram that illustrates the operation of an exemplary method, and a result of execution of computer program instructions embodied on a computer readable memory, in accordance with various exemplary embodiments of this invention.

FIG. 11 is another logic flow diagram that illustrates the operation of a method, and a result of execution of computer program instructions, in accordance with the exemplary embodiments of this invention. In accordance with these exemplary embodiments a method performs, at Block 1111, a step of allocating a first set of CCEs for an associated transmission from an AP to an associated UE (e.g., a CoMP UE). At Block 1120, the method also performs a step of transmitting, to a RRH, a message including an indication of the first set of CCEs for the associated transmission from the access point to the associated user equipment.

The various blocks shown in FIGS. 10 and 11 may be viewed as method steps, and/or as operations that result from operation of computer program code, and/or as a plurality of coupled logic circuit elements constructed to carry out the associated function(s).

An exemplary embodiment in accordance with this invention is a method for uplink control signaling in CoMP operation. The method includes receiving (e.g., via a receiver), at a RRH, a message including an indication of a first set of CCEs for an associated transmission from an AP to a first associated UE. The method also includes allocating (e.g., by a processor) a second set of CCEs for an associated transmission from the RRH to a second associated UE.

In a further exemplary embodiment of the method above, the indication of the first set of CCEs includes an index of the first CCE of the first set of CCEs.

In another exemplary embodiment of any one of the method above, the message includes one or more additional indications of other sets of CCEs for other associated transmissions from the AP to the first associated UE and/or another associated UE.

In a further exemplary embodiment of any one of the method above, the method also includes allocating at least one additional set of CCEs for another associated transmission from the RRH to the second associated UE and/or another associated UE.

In another exemplary embodiment of any one of the methods above, allocating the second set of CCEs includes allocating an index of a first CCE of the second set of CCEs which is different from the index of the first CCE of the first set of CCEs.

In a further exemplary embodiment of any one of the methods above, the first associated UE is a CoMP UE which has the AP as a transmission point and the RRH as a reception point. Alternatively, the second associated UE is a RRH UE which has the RRH as a transmission point and as a reception point.

In another exemplary embodiment of any one of the methods above, the indication is in a bitmap.

In another exemplary embodiment of any one of the methods above, allocating a CCE for the second set of CCEs includes allocating a first CCE from the second set of CCEs for the associated transmission such that subsequent CCEs from the second set of CCEs for the associated transmission overlap a CCE from the first set of CCEs.

In a further exemplary embodiment of any one of the methods above, the method also includes transmitting downlink control information on the second set of CCEs for the second associated UE, and transmitting a PUCCH resource offset parameter for the second associated UE using a higher layer signaling.

In another exemplary embodiment of any one of the methods above, a PUCCH resource offset parameter for a CoMP UE is the same as a PUCCH resource offset parameter for a RRH UE when the CoMP UE and the RRH UE have a same RRH as an uplink reception point.

In a further exemplary embodiment of any one of the methods above, the indication of the first set of CCEs includes an index of a first CCE used for transmission of a corresponding downlink control information assignment.

Another exemplary embodiment in accordance with this invention is a method for uplink control signaling in CoMP operation. The method includes allocating (e.g., by a processor) a first set of CCEs for an associated transmission from an AP to an associated UE. The method also includes transmitting (e.g., via a transmitter), to a RRH, a message including an indication of the first set of CCEs for the associated transmission from the access point to the associated user equipment.

In a further exemplary embodiment of the method above, the indication of the first set of CCEs includes an index of the first CCE of the first set of CCEs.

In another exemplary embodiment of any one of the method above, the method also includes allocating at least one additional set of CCEs for another associated transmission from the AP to the first associated UE and/or another associated UE.

In a further exemplary embodiment of the any one of methods above, the message includes one or more additional indications of other sets of CCEs for other associated transmissions from the AP to the first associated UE and/or another associated UE.

In another exemplary embodiment of any one of the methods above, the method also includes transmitting, on the first set of CCEs, downlink control information for the associated UE.

In a further exemplary embodiment of any one of the methods above, the method also includes transmitting a PUCCH resource offset parameter. Transmitting the PUCCH resource offset parameter may use higher layer signaling.

In another exemplary embodiment of any one of the methods above, the associated UE for the first set of CCEs is a CoMP UE which has the access point as a transmission point and the RRH as a reception point.

In a further exemplary embodiment of any one of the methods above, the indication is in a bitmap.

Another exemplary embodiment in accordance with this invention is a method for uplink control signaling in CoMP operation. The method includes receiving (e.g., via a receiver), at a UE, a transmission of downlink control information beginning at a first CCE of a set of CCEs. The method includes receiving a PUCCH resource offset parameter using higher layer signaling. The method also includes determining (e.g., by a processor) an uplink control channel resource allocation based at least in part on the first CCE of a set of CCE and the PUCCH resource offset parameter.

In a further exemplary embodiment of the method above, the transmission of downlink control information and the PUCCH resource offset parameter are received from an AP and the UE is a CoMP UE which has the AP as a transmission point and a RRH as a reception point. Alternatively, the transmission of downlink control information and the PUCCH resource offset parameter are received from an RRH and the UE for the set of CCE is a RRH UE which has the RRH as a transmission point and as a reception point.

Another exemplary embodiment in accordance with this invention is an apparatus for uplink control signaling in CoMP operation. The apparatus includes at least one processor and at least one memory including computer program code. The at least one memory and the computer program code are configured to, with the at least one processor, cause the apparatus to perform actions. The actions include receiving, at a RRH, a message including an indication of a first set of CCEs for an associated transmission from an AP to a first associated UE. The actions also include allocating a second set of CCEs for an associated transmission from the RRH to a second associated UE.

In a further exemplary embodiment of the apparatus above, the indication of the first set of CCEs includes an index of the first CCE of the first set of CCEs.

In another exemplary embodiment of any one of the apparatus above, the message includes one or more additional indications of other sets of CCEs for other associated transmissions from the AP to the first associated UE and/or another associated UE.

In a further exemplary embodiment of any one of the apparatus above, the actions also include to allocate at least one additional set of CCEs for another associated transmission from the RRH to the second associated UE and/or another associated UE.

In another exemplary embodiment of any one of the apparatus above, allocating the second set of CCEs includes allocating an index of a first CCE of the second set of CCEs which is different from the index of the first CCE of the first set of CCEs.

In a further exemplary embodiment of any one of the apparatus above, the first associated UE is a CoMP UE which has the AP as a transmission point and the RRH as a reception point. Alternatively, the second associated UE is a RRH UE which has the RRH as a transmission point and as a reception point.

In another exemplary embodiment of any one of the apparatus above, the indication is in a bitmap.

In another exemplary embodiment of any one of the apparatus above, allocating a CCE for the second set of CCEs includes allocating a first CCE from the second set of CCEs for the associated transmission such that subsequent CCEs from the second set of CCEs for the associated transmission overlap a CCE from the first set of CCEs.

In a further exemplary embodiment of any one of the apparatus above, the actions also include transmitting downlink control information on the second set of CCEs for the second associated UE, and to transmit a PUCCH resource offset parameter for the second associated UE using a higher layer signaling.

In another exemplary embodiment of any one of the apparatus above, a PUCCH resource offset parameter for a CoMP UE is the same as a PUCCH resource offset parameter for a RRH UE when the CoMP UE and the RRH UE have a same RRH as an uplink reception point.

In a further exemplary embodiment of any one of the apparatus above, the indication of the first set of CCEs includes an index of a first CCE used for transmission of a corresponding downlink control information assignment.

In another exemplary embodiment of any one of the apparatus above, the apparatus is embodied in an integrated circuit.

In a further exemplary embodiment of any one of the apparatus above, the apparatus is embodied in a mobile device.

Another exemplary embodiment in accordance with this invention is an apparatus for uplink control signaling in CoMP operation. The apparatus includes at least one processor and at least one memory including computer program code. The at least one memory and the computer program code are configured to, with the at least one processor, cause the apparatus to perform actions. The actions include allocating a first set of CCEs for an associated transmission from an AP to an associated UE. The actions also include transmitting, to a RRH, a message including an indication of the first set of CCEs for the associated transmission from the access point to the associated user equipment.

In another exemplary embodiment of the apparatus above, the indication of the first set of CCEs includes an index of the first CCE of the first set of CCEs.

In another exemplary embodiment of any one of the apparatus above, the actions also include to allocate at least one additional set of CCEs for another associated transmission from the AP to the first associated UE and/or another associated UE.

In a further exemplary embodiment of any one of the apparatus above, the message includes one or more additional indications of other sets of CCEs for other associated transmissions from the AP to the first associated UE and/or another associated UE.

In another exemplary embodiment of any one of the apparatus above, the actions also include transmitting, on the first set of CCEs, downlink control information for the associated UE.

In a further exemplary embodiment of any one of the apparatus above, the actions also include transmitting a PUCCH resource offset parameter. Transmitting the PUCCH resource offset parameter may use higher layer signaling.

In another exemplary embodiment of any one of the apparatus above, the associated UE for the first set of CCEs is a CoMP UE which has the access point as a transmission point and the RRH as a reception point.

In a further exemplary embodiment of any one of the apparatus above, the indication is in a bitmap.

In another exemplary embodiment of any one of the apparatus above, the apparatus is embodied in an integrated circuit.

In a further exemplary embodiment of any one of the apparatus above, the apparatus is embodied in a mobile device.

Another exemplary embodiment in accordance with this invention is an apparatus for uplink control signaling in CoMP operation. The apparatus includes at least one processor and at least one memory including computer program code. The at least one memory and the computer program code are configured to, with the at least one processor, cause the apparatus to perform actions. The actions include receiving, at a UE, a transmission of downlink control information beginning at a first CCE of a set of CCE. The actions include receiving a PUCCH resource offset parameter using higher layer signaling. The actions also include determining an uplink control channel resource allocation based at least in part on the first CCE of the set of CCE and the PUCCH resource offset parameter.

In a further exemplary embodiment of the apparatus above, the transmission of downlink control information and the PUCCH resource offset parameter are received from an AP and the UE is a CoMP UE which has the AP as a transmission point and a RRH as a reception point. Alternatively, the transmission of downlink control information and the PUCCH resource offset parameter are received from an RRH and the UE for the set of CCE is a RRH UE which has the RRH as a transmission point and as a reception point.

In another exemplary embodiment of any one of the apparatus above, the apparatus is embodied in an integrated circuit.

In a further exemplary embodiment of any one of the apparatus above, the apparatus is embodied in a mobile device.

Another exemplary embodiment in accordance with this invention is a computer readable medium for uplink control signaling in CoMP operation. The computer readable medium is tangibly encoded with a computer program executable by a processor to perform actions. The actions include receiving, at a RRH, a message including an indication of a first set of CCEs for an associated transmission from an AP to a first associated UE. The actions also include allocating a second set of CCEs for a second associated transmission from the RRH to an associated UE.

In a further exemplary embodiment of the computer readable medium above, the first associated UE is a CoMP UE which has the AP as a transmission point and the RRH as a reception point. Alternatively, the second associated UE is a RRH UE which has the RRH as a transmission point and as a reception point.

In another exemplary embodiment of any one of the computer readable media above, the message includes one or more additional indications of other sets of CCEs for other associated transmissions from the AP to the first associated UE and/or another associated UE.

In a further exemplary embodiment of any one of the computer readable media above, the actions also include allocating at least one additional set of CCEs for another associated transmission from the RRH to the second associated UE and/or another associated UE.

In another exemplary embodiment of any one of the computer readable media above, the indication is in a bitmap.

In another exemplary embodiment of any one of the computer readable media above, allocating a CCE for the second set of CCEs includes allocating a first CCE from the second set of CCEs for the associated transmission such that subsequent CCEs from the second set of CCEs for the associated transmission overlap a CCE from the first set of CCEs.

In a further exemplary embodiment of any one of the computer readable media above, the actions also include transmitting downlink control information on the second set of CCEs for the second associated UE, and transmitting a PUCCH resource offset parameter for the second associated UE using a higher layer signaling.

In another exemplary embodiment of any one of the computer readable media above, a PUCCH resource offset parameter for a CoMP UE is the same as a PUCCH resource offset parameter for a RRH UE when the CoMP UE and the RRH UE have a same RRH as an uplink reception point.

In a further exemplary embodiment of any one of the computer readable media above, the indication of the first set of CCEs includes an index of a first CCE used for transmission of a corresponding downlink control information assignment.

In another exemplary embodiment of any one of the computer readable media above, the computer readable medium is a non-transitory computer readable medium (e.g., CD-ROM, RAM, flash memory, etc.).

A further exemplary embodiment in accordance with this invention is a computer readable medium for uplink control signaling in CoMP operation. The computer readable medium is tangibly encoded with a computer program executable by a processor to perform actions. The actions include allocating a first set of CCEs for an associated transmission from an AP to an associated UE. The actions also include transmitting, to a RRH, a message including an indication of the first set of CCEs for the associated transmission from the access point to the associated user equipment.

In another exemplary embodiment of the computer readable medium above, the indication of the first set of CCEs includes an index of the first CCE of the first set of CCEs.

In another exemplary embodiment of any one of the computer readable media above, the actions also include allocating at least one additional set of CCEs for another associated transmission from the AP to the first associated UE and/or another associated UE.

In a further exemplary embodiment of any one of the computer readable media above, the message includes one or more additional indications of other sets of CCEs for other associated transmissions from the AP to the first associated UE and/or another associated UE.

In another exemplary embodiment of any one of the computer readable media above, the actions also include transmitting, on the first set of CCEs, downlink control information for the associated UE.

In a further exemplary embodiment of any one of the computer readable media above, the actions also include transmitting a PUCCH resource offset parameter. Transmitting the PUCCH resource offset parameter may use higher layer signaling.

In another exemplary embodiment of any one of the computer readable media above, the associated UE for the first set of CCEs is a CoMP UE which has the access point as a transmission point and the RRH as a reception point.

In a further exemplary embodiment of any one of the computer readable media above, the indication is in a bitmap.

In another exemplary embodiment of any one of the computer readable media above, the computer readable medium is a non-transitory computer readable medium (e.g., CD-ROM, RAM, flash memory, etc.).

A further exemplary embodiment in accordance with this invention is a computer readable medium for uplink control signaling in CoMP operation. The computer readable medium is tangibly encoded with a computer program executable by a processor to perform actions. The actions include receiving, at a UE, a transmission of downlink control information beginning at a first CCE of a set of CCE. The actions include receiving a PUCCH resource offset parameter using higher layer signaling. The actions also include determining an uplink control channel resource allocation based at least in part on the first CCE of the set of CCE and the PUCCH resource offset parameter.

In another exemplary embodiment of the computer readable medium above, the transmission of downlink control information and the PUCCH resource offset parameter are received from an AP and the UE is a CoMP UE which has the AP as a transmission point and a RRH as a reception point. Alternatively, the transmission of downlink control information and the PUCCH resource offset parameter are received from an RRH and the UE for the set of CCE is a RRH UE which has the RRH as a transmission point and as a reception point.

In a further exemplary embodiment of any one of the computer readable media above, the computer readable medium is a non-transitory computer readable medium (e.g., CD-ROM, RAM, flash memory, etc.).

Another exemplary embodiment in accordance with this invention is an apparatus for uplink control signaling in CoMP operation. The apparatus includes means for receiving (e.g., a receiver), at a RRH, a message including an indication of a first set of CCEs for an associated transmission from an AP to a first associated UE. The apparatus also includes means for allocating (e.g., a processor) a second set of CCEs for an associated transmission from the RRH to a second associated UE.

In a further exemplary embodiment of the apparatus above, the indication of the first set of CCEs includes an index of the first CCE of the first set of CCEs.

In another exemplary embodiment of any one of the apparatus above, the message includes one or more additional indications of other sets of CCEs for other associated transmissions from the AP to the first associated UE and/or another associated UE.

In a further exemplary embodiment of any one of the apparatus above, the apparatus also includes means for allocating at least one additional set of CCEs for another associated transmission from the RRH to the second associated UE and/or another associated UE.

In another exemplary embodiment of any one of the apparatus above, allocating the second set of CCEs includes allocating an index of a first CCE of the second set of CCEs which is different from the index of the first CCE of the first set of CCEs.

In a further exemplary embodiment of any one of the apparatus above, the first associated UE is a CoMP UE which has the AP as a transmission point and the RRH as a reception point. Alternatively, the second associated UE is a RRH UE which has the RRH as a transmission point and as a reception point.

In another exemplary embodiment of any one of the apparatus above, the indication is in a bitmap.

In another exemplary embodiment of any one of the apparatus above, allocating a CCE for the second set of CCEs includes allocating a first CCE from the second set of CCEs for the associated transmission such that subsequent CCEs for the associated transmission overlap a CCE from the first set of CCEs.

In a further exemplary embodiment of any one of the apparatus above, the apparatus also includes means for transmitting downlink control information on the second set of CCEs for the second associated UE, and means for transmitting a PUCCH resource offset parameter for the second associated UE using a higher layer signaling.

In another exemplary embodiment of any one of the apparatus above, a PUCCH resource offset parameter for a CoMP UE is the same as a PUCCH resource offset parameter for a RRH UE when the CoMP UE and the RRH UE have a same RRH as an uplink reception point.

In a further exemplary embodiment of any one of the apparatus above, the indication of the first set of CCEs includes an index of a first CCE used for transmission of a corresponding downlink control information assignment.

Another exemplary embodiment in accordance with this invention is an apparatus for uplink control signaling in CoMP operation. The apparatus includes means for allocating (e.g., a processor) a first set of CCEs for an associated transmission from an AP to an associated UE. The apparatus also includes means for transmitting (e.g., a transmitter), to a RRH, a message including an indication of the first set of CCEs for the associated transmission from the access point to the associated user equipment.

In a further exemplary embodiment of the apparatus above, the indication of the first set of CCEs includes an index of the first CCE of the first set of CCEs.

In another exemplary embodiment of any one of the apparatus above, the apparatus also includes means for allocating at least one additional set of CCEs for another associated transmission from the AP to the first associated UE and/or another associated UE.

In another exemplary embodiment of any one of the apparatus above, the message includes one or more additional indications of other sets of CCEs for other associated transmissions from the AP to the first associated UE and/or another associated UE.

In a further exemplary embodiment of any one of the apparatus above, the apparatus also includes means for transmitting, on the first set of CCEs, downlink control information for the associated UE.

In another exemplary embodiment of any one of the apparatus above, the apparatus also includes means for transmitting a PUCCH resource offset parameter. Transmitting the PUCCH resource offset parameter may use higher layer signaling.

In a further exemplary embodiment of any one of the apparatus above, the associated UE for the first set of CCEs is a CoMP UE which has the access point as a transmission point and the RRH as a reception point.

In another exemplary embodiment of any one of the apparatus above, the indication is in a bitmap.

A further exemplary embodiment in accordance with this invention is an apparatus for uplink control signaling in CoMP operation. The apparatus includes means for receiving (e.g., a receiver), at a UE, a transmission of downlink control information beginning at a first CCE of a set of CCE. The apparatus includes means for receiving (e.g., a receiver) a PUCCH resource offset parameter using higher layer signaling. The apparatus also includes means for determining (e.g., a processor) an uplink control channel resource allocation based at least in part on the first CCE of the set of CCE and the PUCCH resource offset parameter.

In another exemplary embodiment of the apparatus above, the transmission of downlink control information and the PUCCH resource offset parameter are received from an AP and the UE is a CoMP UE which has the AP as a transmission point and a RRH as a reception point. Alternatively, the transmission of downlink control information and the PUCCH resource offset parameter are received from an RRH and the UE for the set of CCE is a RRH UE which has the RRH as a transmission point and as a reception point.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., $n_{CCE}$, etc.) are not intended to be limiting in any respect, as these parameters may be identified by any suitable names. Further, the formulas and expressions that use these various parameters may differ from those expressly disclosed herein. Further, the various names assigned to different channels (e.g., PUCCH, PDCCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving, at a remote radio head, a message comprising an indication of a first set of control channel elements for an associated transmission from an access point to a first associated user equipment; and
   allocating, at least in part in response to the receiving, a second set of control channel elements for an associated transmission from the remote radio head to a second associated user equipment, wherein the second set of control channel elements are different from the first set of control channel elements.

2. The method of claim 1, wherein the indication of the first set of control channel elements comprises an index of a first control channel element of the first set of control channel elements used for transmission of a corresponding downlink control information assignment.

3. The method of claim 2, wherein allocating the second set of control channel elements comprises allocating an index of a first control channel element of the second set of control channel elements which is different from the index of the first control channel element of the first set of control channel elements.

4. The method of claim 1 comprising:
   allocating the first set of control channel elements for the associated transmission from the access point to the first associated user equipment; and
   transmitting, to the remote radio head, the message comprising the indication of the first set of control channel elements.

5. An apparatus, comprising
   at least one processor; and
   at least one memory including computer program code, the at least one memory and the computer program code configured to, with the at least one processor, cause the apparatus to perform at least the following:
   receive, at a remote radio head, a message comprising an indication of a first set of control channel elements for an associated transmission from an access point to a first associated user equipment; and
   allocate, at least in part in response to the receiving, a second set of control channel elements for an associated transmission from the remote radio head to a second associated user equipment, wherein the second set of control channel elements are different from the first set of control channel elements.

6. The apparatus of claim 5, wherein the indication of the first set of control channel elements comprises an index of a first control channel element of the first set of control channel elements used for transmission of a corresponding downlink control information assignment.

7. The apparatus of claim 6, wherein allocating the second set of control channel elements comprises allocating an index of a first control channel element of the second set of control channel elements which is different from the index of the first control channel element of the first set of control channel elements.

8. The apparatus of claim 5, wherein the first associated user equipment is a coordinated multi-point user equipment which has the access point as a transmission point and the remote radio head as a reception point.

9. The apparatus of claim 5, wherein the second associated user equipment is a remote radio head user equipment which has the remote radio head as a transmission point and as a reception point.

10. The apparatus of claim 5, wherein the at least one memory and the computer program code are further configured to cause the apparatus to transmit downlink control information on the second set of control channel elements for the second associated user equipment, and to transmit a physical uplink control channel resource offset parameter for the second associated user equipment using a higher layer signaling.

11. The apparatus of claim 5, wherein the message comprises one or more additional indications of other sets of control channel elements for other associated transmissions from the access point to the first associated user equipment and/or another associated user equipment.

12. The apparatus of claim 5, wherein the at least one memory and the computer program code are further configured to cause the apparatus, when allocating a control channel element for the second set of control channel elements, to allocate a first control channel element for the associated transmission such that subsequent control channel elements for the associated transmission overlap a control channel element from the first set of control channel elements.

13. The apparatus of claim 5, wherein a physical uplink control channel resource offset parameter for the first associated user equipment is the same as a physical uplink control channel resource offset parameter for the second associated user equipment when the first associated user equipment and the second associated user equipment have a same remote radio head as an uplink reception point.

14. A system comprising:
   at least one processor; and
   at least one memory including computer program code, the at least one memory and the computer program code configured to, with the at least one processor, cause the system to perform at least the following:
   allocate a first set of control channel elements for an associated transmission from an access point to an associated user equipment;
   transmit to a remote radio head, a message comprising an indication of the first set of control channel elements;
   receive, at the remote radio head, a message comprising the indication of the first set of control channel elements for the associated transmission from the access point to the first associated user equipment; and
   allocate, at least in part in response to the reception, a second set of control channel elements for an associated transmission from the remote radio head to a second associated user equipment, wherein the second set of control channel elements are different from the first set of control channel elements.

15. The system of claim 14, wherein the indication of the first set of control channel elements comprises an index of a first control channel element of the first set of control channel elements.

16. The system of claim 14, wherein the at least one memory and the computer program code are further configured to cause the access point to transmit, on the first set of control channel elements, downlink control information for the first associated user equipment.

17. The system of claim 14, wherein the at least one memory and the computer program code are further configured to cause the system to transmit a same physical uplink control channel resource offset parameter using a higher layer signaling to the first and second associated user equipment.

18. The system of claim 14, wherein the at least one memory and the computer program code are further configured to cause the system to allocate at least one additional set of control channel elements for another associated transmission from the access point to the first associated user equipment and/or another associated user equipment, and the message comprises one or more additional indications of other sets of control channel elements for other associated transmissions from the access point to the first associated user equipment and/or another associated user equipment.

19. A computer program embodied on a non-transitory computer readable storage medium, the computer program configured to control a processor to perform operations, comprising:
   receiving, at a remote radio head, a message comprising an indication of a first set of control channel elements for an associated transmission from an access point to a first associated user equipment; and
   allocating, at least in part in response to the receiving, a second set of control channel elements for an associated transmission from the remote radio head to a second associated user equipment, wherein the second set of control channel elements are different from the first set of control channel elements.

\* \* \* \* \*